Figure 1:
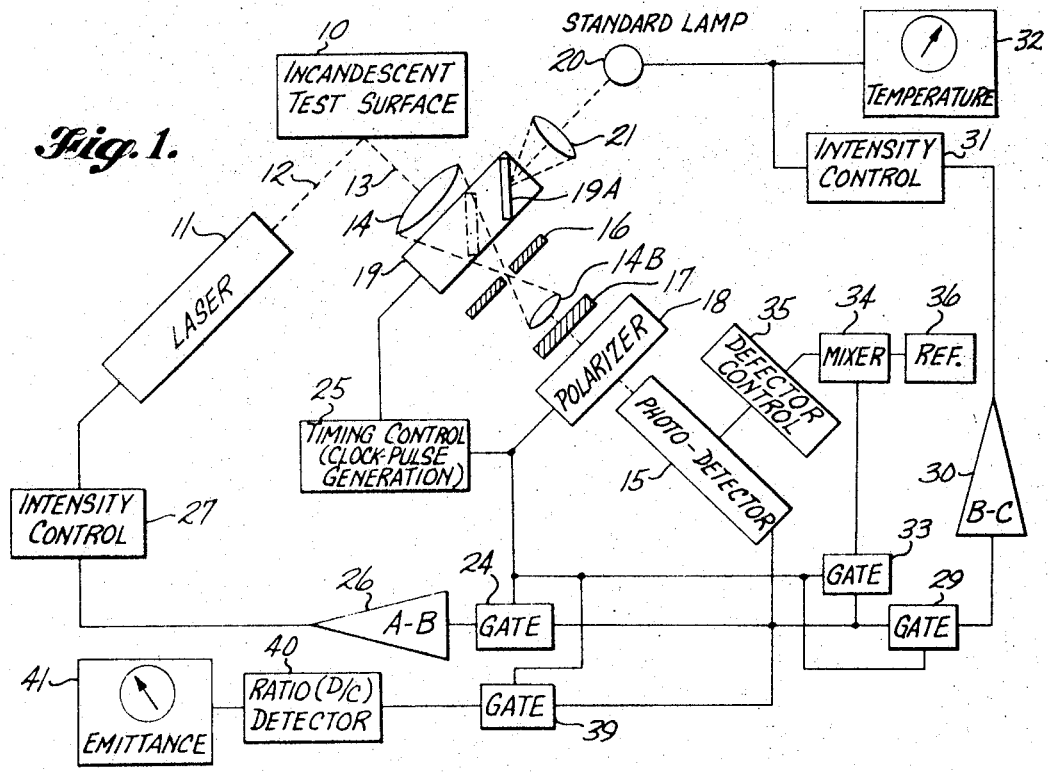

INVENTORS
WEIGHTSTILL W. WOODS
DALE L. MARTIN
JAMES K. MARSHALL
by Christensen, Sanborn, & Matthews
ATTORNEYS United States Patent Office 3,462,224
Patented Aug. 19, 1969

3,462,224
POLARIZATION PYROMETER
Weightstill W. Woods, Redmond, Dale L. Martin, Bellevue, and James K. Marshall, Seattle, Wash., assignors to The Boeing Company, Seattle, Wash., a corporation of Delaware
Filed Oct. 17, 1966, Ser. No. 587,221
Int. Cl. G01j 5/56
U.S. Cl. 356—47                9 Claims The present invention relates to an improved system for measuring the temperature of a given body and more particularly to an improved pyrometer for determining elevated temperatures.

Radiant energy responsive means such as optical pyrometers are generally used for measuring the surface temperature of incandescent metals. Single and multi-colored pyrometry techniques and devices have been utilized in the past, but in each case the accuracy of the measurement has depended to a large extent upon certain assumptions as to the surface emittance of the body whose temperature is being determined. As a result the accuracy of the temperature readings has depended upon the degree of justification of the assumptions made regarding the surface emittance. The emissivity of a surface is somewhat unpredictable due to physical differences in different areas of a given surface being observed as well as to changes due to surface working and foreign materials which might be on the surface under observation. In the use of various optical pyrometers an observer through visual observation determines when the radiation characteristics of the object correspond to the radiant energy from a known standard and thus further problems are encountered in view of variations in the ability of different observers to determine coincidence in the relative "colors" of an incandescent body and a standard to which it is compared. It would thus be advantageous to have a temperature measuring system which is independent from variations due to inherent characteristics of the operator and also to have a system which would operate at temperatures well above 3000° F.

It is therefore an object of the present invention to provide an improved pyrometer. Another object of the present invention is to provide a pyrometer which is based upon the polarization characteristics of the radiation emanating from the surface of a body.

An additional object of the present invention is to provide a polarization pyrometer making use of a laser for supplying sufficient external radiant energy to a surface to cause the total radiation emanating from the surface to correspond to that of a black body at the temeprature of the body in question. Another object is to provide an automatic pyrometer which indicates temperature without the need for operator visual comparison to a known standard.

A further object of the present invention is to provide a novel polarization pyrometer utilizing a pair of feedback control systems to automatically indicate the temperature of an object at temperatures well above 3000° F. A further object of the present invention is to provide an improved polarization pyrometer which not only provides an indication of the temeprature of a body but also a direct reading of the emissivity of the body.

It can be shown that the emissive power of any body at a particular temperature and wavelength of radiation is equal to the emissive power of a black body for the same temperature and wavelength multiplied by the absorptivity of the body under those conditions.

Thus in accordance with the teachings of the present invention a beam of nonpolarized radiant energy of high intensity, such as that of a laser, is directed against the surface of a body the temperature of which is to be determined. A radiation detector such as a photomultiplier tube is positioned for receipt of energy reflected as well as emitted by the body with the intensity of the radiation from the laser being controlled by output signals from the radiation detector. The intensity of the laser beam is adjusted such that the radiation received by the detector corresponds to that of a black body at the temperature of the object.

It is known that the radiation emitted from a black body is unpolarized, whereas the radiation emitted from a glowing metal is partially polarized (at observation angles other than normal to the surface). Thus in the system of the present invention the radiation emanating from the surface (that is the sum of the radiation emitted and the portion of the laser beam reflected) is analyzed through the use of a polarizing medium positioned between the surface of the body and the radiation detector so that mutually perpendicular polarization components of the emanating radiation will be detected and output signals proportional to the mutually perpendicular components provided. A differential amplifier connected between the laser intensity control amplifier and the output of the radiation detector serves to amplify the difference between the signals generated by the detector for each of the two mutually perpendicular radiant energy components. The intensity of the laser is then automatically adjusted until the difference between the signals caused by the mutually perpendicular radiant energy components reaches a minimum. At that point the total radiation emanating from the surface corresponds to the radiation of a black body at the temperature of the surface being analyzed.

The radiation emanating from the test surface is automatically compared with the radiation emanating from a known standard lamp with any difference between the two giving rise to a signal which is applied through a second feedback system for adjusting the energization of the standard lamp. In the preferred embodiment of the system disclosed herein the same optical components are utilized for directing the radiation emanating from the test surface and from the standard source to the detector in order to reduce extraneous errors. Through the use of a suitable timing control network the photomultiplier alternately receives energy from the test surface and from the standard lamp. The polarization of the test surface radiation applied to the photomultiplier is also periodically altered. The intensity of the laser radiation as well as the degree of energization of the standard lamp are simultaneously adjusted until the total radiation emanating from the test surface corresponds to that of a black body at the temperature of the test surface and the energization of the standard lamp is brought to a condition corresponding to such total radiation. A temperature indicator connected to the energization circuit for the standard lamp then directly indicates the true temperature of the test surface.

A further advantage is achieved with the system of the present invention through the use of a signal ratio detector coupled with the output circuit of the radiation detector and adapted to provide a signal proportional to the ratio of the radiant energy emitted by the test surface in the absence of the laser beam to the radiation from the standard lamp when it is operating at a condition corresponding to that of a black body at the temperature of the test surface. Thus an emittance indicator coupled with the output of the ratio detector serves to provide a direct indication of the emissivity of the test surface for any given temperature.

Figure 2:
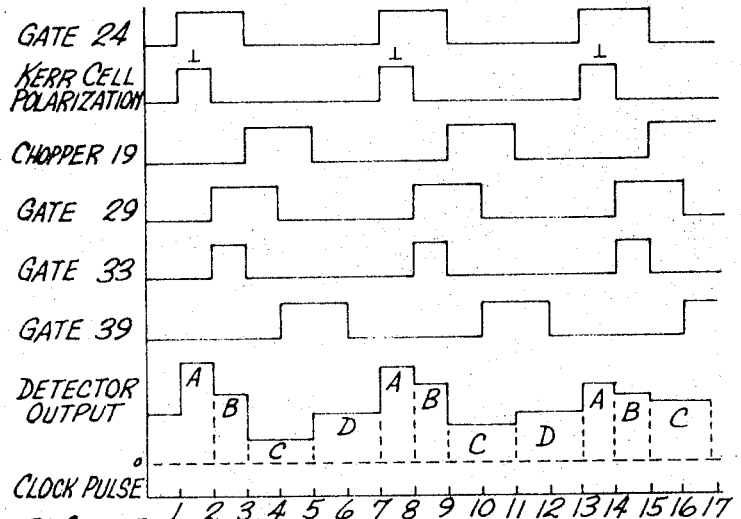
Figure 3:
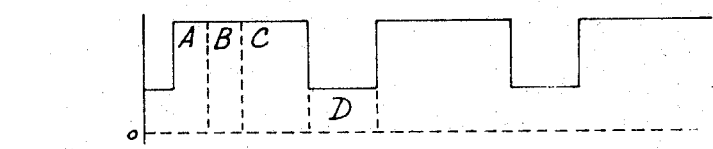

The above as well as additional advantages and objects of the invention will be more clearly understood from the following description when read with reference to the accompanying drawings wherein:

FIGURE 1 is a block diagram of a preferred embodiment of the invention,

FIGURE 2 is a timing diagram illustrating the wave forms of various signals in the system prior to achievement of stable conditions corresponding to the temperature indicator indicating the temperature of the test surface, and FIGURE 3 is a further timing diagram illustrating the various wave forms for the conditions which exist when the temperature indicator is indicating the temperature of the test surface.

Referring now to the drawings and in particular to FIGURE 1, a test surface 10 is illustrated as being in the path of the output beam of a source of unpolarized radiation provided by a laser 11. As is well known, a laser provides an output beam of radiant energy which is of one or more discrete frequencies with the radiation being nonpolarized and of high intensity. The laser beam 12 after being reflected from the surface 10, together with radiation emitted by the test surface 10, forms a beam of radiant energy 13 which passes through a first optical element 14 where it is focused and directed toward the entrance opening of a radiation detector illustrated as a photomultiplier 15. A suitable field stop 16 and narrowband filter 17 are disposed between the photomultiplier 15 and the test surface. A polarizing device illustrated as a Kerr cell polarizer 18 is disposed between the filter 17 and the photomultiplier tube 15 with the arrangement being such that the radiant energy entering the photomultiplier tube 15 is selectively polarized in either of two mutually perpendicular directions.

The system further includes a vibrating radiant energy control device illustrated as a vibrating chopper assembly 19 having a radiation reflecting element 19A included therein and movable between the two indicated positions. When in the position shown by solid lines, the beam 13 from the surface 10 is unobstructed and thus enters detector 15. When the element is in the position shown in dashed lines, the beam 13 is blocked and the energy from a standard lamp 20 is directed to the detector. Thus radiant energy will be selectively directed from the test surface 10 or from the standard lamp 20 onto the optical element 14B and hence to the photomultiplier 15. A lens system illustrated diagrammatically at 21 serves to focus the radiant energy from the standard lamp 20 onto the vibrating chopper and directive assembly 19.

The intensity of the radiation provided by the laser 11 onto the test surface 10 is adjusted automatically to a condition such that the radiation received by the photomultiplier 15 from the test surface 10 by virtue of emission and reflection corresponds to that of a black body at the temperature of the test surface. The automatic adjustment of the laser intensity is provided through the use of a first signal feedback system which includes an amplifier 26 having an input circuit coupled with the output circuit of the photomultiplier tube 15 through a gate circuit 24 and having its output circuit coupled with the laser intensity control 21. The amplifier 26 is operative to provide an output signal representative of the difference between the output signals of the photomultiplier 15 when the radiant energy received thereby is respectively polarized in first and second mutually perpendicular directions by the polarizer 18 when the laser 11 is directing energy against the surface 10. When the system is first turned on the output of the laser is either zero or very low, and therefore since the radiation emitted by the surface 10 is polarized a difference exists between the two polarized components of radiation intermittently provided through polarizer 18 to the detector 15. The feedback circuit including the amplifier 26 and intensity control 27 therefore responds to the signal differential resulting from detector 15 and serves to adjust the intensity of the output radiation of laser 11. As the intensity of the laser beam 12 is increased a condition will be reached such that the radiation emanating from the surface 10 and directed onto detector 15 is nonpolarized. When this condition is reached, the difference in the signals from the amplifier 26 for the mutually perpendicular radiation components applied thereto becomes a minimum. At that point the radiation emanating from the test surface 10 corresponds to that of a black body at the temperature of the test surface.

The system further includes a second amplifier 30 coupled with the output circuit of the photomultiplier 15 through a gate circuit 29. The amplifier 30 provides output signals proportional to the difference between the signals from the photomultiplier 15 during a first time when the photomultiplier is receiving the combined reflected and emitted radiation from test surface 10 and the time when it is receiving the radiant energy from the standard lamp 20. A second intensity control device 31 coupled between the differential amplifier 30 and the standard lamp 20 serves to adjust the energization of the standard lamp 20 in a direction to reduce the difference signal of the amplifier 30 and thereby bring the standard lamp to an operating condition such that the radiation therefrom directed to detector 15 corresponds to that of a black body at the temperature of the test surface 10. The vibrating chopper assembly 19 operates in timed relation to the various system components so that the standard lamp and the laser are automatically adjusted to bring the system to a condition of stability. The energization of the standard lamp is therefore directly proportional to the temperature of the test surface and thus the temperature indicator 32 coupled to the lamp 20 accurately indicates the temperature of the test surface.

A feedback system is provided for automatic sensitivity or gain control of the photomultiplier. Constant gain of the photomultiplier is insured by feedback control of dynode voltages and thus peak pulse output at a given level is maintained. This feedback system includes the gate circuit 33 coupled with the photomultiplier and adapted to pass the signals generated thereby when the photomultiplier is receiving reflected and emitted radiation from the test surface. The signal from gate 33 is applied to the balance control 34 connected between the dynode supply control 35 and a source of reference potential 36.

The emittance (or emissivity) of a black body is defined as unity, and the emission of any other object at the same temperature compared to the emission of the black body is the emittance of that object. In the present system the laser provides radiation to the test surface only when the gate 24 is open and therefore, as described in in greater detail with reference to FIGURE 2, the system operates such that the signal from the detector 15 is proportional to the radiation emitted by the standard lamp at one time and at another time the output is proportional to the radiation emitted by the test surface. Therefore the emittance of the surface for any given temperature is directly provided by the emittance indicator 41 coupled to the detector output by a gate 39. While the emittance indicator 41 could be coupled to the detector output and adjusted to respond directly to the test surface emission signal, a radio detector 40 is connected between the gate 39 and the indicator for providing signals to the indicator which are automatically adjusted to the reference level of the radiation of a black body at the temperature of the test object.

The timing of the operation of the various devices and components is provided by a master timing control in the form of a clock pulse generator 25. The clock pulse generator 25 together with the gate circuits associated with the various components serves to insure proper operation of the various devices at the time indicated in the wave forms of FIGURES 2 and 3. As noted above, the laser provides radiation to the test surface only when gate 24 is open and thus the laser output is effectively 100% modulated. Various arrangements could be used for such gating of the laser output, with the laser preferably being of the solid state CW type which provides a high spectral intensity.

Referring now to FIGURE 2 the timing of the various gate, the chopper 19, and the Kerr cell polarizer will be described for one system operating on the basis of clock pulse control. When the first clock pulse is received the gate 24 is opened so that the amplifier 26 will be responsive to the output signals from the photomultiplier 15 and the laser will provide radiation to the test surface. Simultaneously the angle of polarization of the Kerr cell is rotated 90° so that the radiation being received by the photomultiplier 15 will include only those components which are polarized at an angle perpendicular to the radiation previously received prior to the occurrence of the first clock pulse. The vibrating chopper assembly 19, which may include a reed driven at resonance with the clock pulse generator deriving its basic keying signals from the chopper, is in a position such that radiant energy emitted and reflected from the test surface 10 will be applied to the photomultiplier 15 and hence between the first and second clock pulses the detector output will be represented by the portion of the detector output signal indicated as the signal A. When the second clock pulse is received the angle of polarization of the Kerr cell is returned to its initial condition which is at a polarization angle perpendicular to that existing in the time between the first and second clock pulses. The wave form for the detector output illustrated in FIGURE 2 is for the condition prior to the radiation emanating from the test surface 10 corresponding to that of a black body. The detector output between the second and third clock pulses therefore is different from the detector output between the first and second clock pulse intervals due to the fact that the radiation emanating from the test surface is polarized. For purpose of illustration the B signal is shown as being of a lower amplitude than the A signal.

The chopper 19 at the time of occurrence of the third clock pulse moves the radiant energy directing member 19A to its second position such that radiant energy from the standard lamp 20 will be directed onto the photomultiplier 15 between the third and fifth clock pulses. For purpose of illustration, the detector output is shown during the clock times 3–5 as being lower than during the clock times 1–3 and thus represents the condition wherein the intensity of the standard lamp radiation is less than the radiation emanating from the test surface 10. The gate 29 preceding the amplifier 30 opens in response to the second clock pulse and remains open until the occurrence of the fourth clock pulse so that the amplifier 30 responds to the B and C detector output signals and provides an adjusting signal to the standard lamp control 31. This causes the intensity of the standard lamp to be increased. The gate 33 also opens in response to the second clock pulse so that the dynode power supply voltage is adjusted in accordance with the level of the detector output signal B.

The fourth clock pulse serves to open the gate 39 with the gate 39 remaining open until the occurrence of the sixth clock pulse. It will be seen that the chopper 19 directs radiation from the standard lamp to the detector between the third and fifth clock pulses and from the test surface to the detector between the fifth and seventh clock pulses. Since the gate 24 is closed between the third and seventh clock pulses, the laser 11 does not provide radiation to the surface during this time. Therefore when the chopper 19 returns to its initial position (solid line position) at the fifth clock pulse the output of the detector is proportional to the radiation from the test surface absent the laser energy for the interval 5–7. Thus the ratio detector 40 receives the C and D detector output signals when gate 39 is open for indicating the emittance of the test surface. As is well known, the emittance (or emissivity) of an object is never greater than unity since the emissivity of a perfect radiator or black body is defined as unity. Thus under the conditions illustrated during the first ten clock pulses in FIGURE 2 the emittance indicator is held inoperative or nonindicating since the intensity of the standard lamp has not been brought to a condition of radiation greater than that of the test surface.

When the occurrence of the seventh clock pulse the above sequence is again repeated, but it will be noted that the system has responded to start to reduce the difference between the A and B signals and also the intensity of the radiation of the standard lamp starts to increase due to the action of the differential amplifier 30.

In FIGURE 3 the detector output wave form is illustrated for the condition when the system has been brought to balance with the radiation from the standard lamp corresponding to the reflected and emitted radiation from the test surface. The signal components A and B are also shown as being equal and thus representing the condition when the radiation emanating from the surface 10 is nonpolarized. It should be noted that the D signal remains constant since this is the signal corresponding to the radiation portion of the total energy emanating from the surface 10. The C signal represents unity for the emittance indicator and thus the indication provided by the indicator 41 is proportional to the amplitude of the D signal. As such it is a direct indication of the emittance of the test surface. Thus it will be seen that the system has automatically adjusted the intensity of the laser to a condition such that the total radiation reflected and emitted by the surface 10 achieves a nonpolarized state and also that the intensity of the standard lamp radiation has been adjusted to be equal to the radiation reflected and emitted from the test surface 10. Accordingly, it will be seen that the temperature indication provided by the indicator 32 is an accurate indication of the surface temperature.

There has thus been disclosed an improved pyrometer which operates on the basis of polarization techniques utilizing a laser and appropriate feedback loops for automatically adjusting the total radiation emanating from the test surface to bring the same into a condition corresponding to that of a black body at the temperature of the test surface. The temperature as well as emittance of the test surface are accurately and automatically provided by the system. While the invention has been disclosed by reference to a presently preferred embodiment thereof, it is to be understood that those modifications and changes which become obvious to a person skilled in the art as a result of the teachings hereof will be encompassed by the following claims.

What is claimed is:

1. A temperature measuring system comprising in combination: a first standard radiant energy source; temperature indicating means coupled with said source; a second high intensity radiant energy source adapted to direct radiant energy onto the object the temperature of which is to be determined; radiation detection means responsive to radiation emitted by said first source and to radiation emanating from the object the temperature of which is to be determined by virtue of radiation and reflection of energy directed thereon by said second source; radiant energy polarizing means disposed between said detection means and the object; and intensity control means connected between said detection means and said sources and operative to adjust the intensity of the radiation emitted by said sources such that first and second output signals from said detection means, which are respectively proportional to the radiation emanating from the object when polarized along first and second axes by said polarizing means are substantially equal and also substantially equal to a third output signal from said detection means which is proportional to the radiation provided thereto from said first source.

2. A system as defined in claim 1 wherein said second source includes a laser.

3. A system as defined in claim 1 wherein said detection means comprises a single detector, and including means disposed between said detector and the object and between the detector and said first source for alternately permitting radiation from the object or from said first source to reach said detector.

4. A system as defined in claim 3 wherein said first source is a standard lamp and said second source is a laser.

5. A system as defined in claim 3 and including an emittance indicator coupled with said detector, and control means coupled with said second source and with said emittance indicator for periodically preventing the irradiation of the object by said second source and rendering said emittance indicator responsive to output signals from said detector proportional to the intensity of radiation received from said first source and from the object when it is not irradiated by said second source.

6. A system as defined in claim 1 including means for periodically interrupting the output of radiant energy from said second source to the object; and emittance indicator means coupled with said detection means and responsive to said third signal and to one of said first or second signals when the output of said second source is interrupted.

7. A pyrometer comprising in combination: a laser adapted to provide a high intensity beam of radiant energy onto the surface the temperature of which is to be determined; a standard lamp having a known radiation versus temperature characteristic; temperature indicating means coupled with said standard lamp; radiation detection means providing first output signals proportional to the radiation emanating from said surface as a result of radiation and the reflection of energy directed onto said surface by said laser and for providing second output signals proportional to radiation received from said standard lamp; polarizing means disposed between said surface and said radiation detection means and selectively operable for polarizing the radiation received by said detector means from said source into first and second mutually perpendicular polarized radiation components; and first control means coupled with said detector means, said lamp, and with said laser for adjusting the intensity of the radiation from said laser to reduce the difference between the signals from said detector means when the radiation from said surface is polarized in said first and second directions and to adjust the intensity of the radiation from said standard lamp to a condition such that the output signals from said detector means corresponding to radiation received from said surface and from said standard lamp are substantially equal.

8. The pyrometer as defined in claim 7 wherein said detection means comprises a single radiation detector and wherein said pyrometer further includes radiation directing means disposed between said detector and said surface and between said detector and said lamp for selectively directing radiation from said surface or said lamp onto said radiation detector; and timing control means coupled with said first control means, said polarizing means, and said radiation directing means.

9. A pyrometer as defined in claim 8 and further including an emittance indicator coupled with said radiation detector and providing an indication of the ratio of the output signals from said detector resulting from the receipt of radiation from said surface in the absence of the receipt of reflected energy from said laser and radiation received by said detector from said standard lamp.

No references cited.

RONALD L. WIBERT, Primary Examiner

P. K. GODWIN, Assistant Examiner

U.S. Cl. X.R.

350—150; 356—43